United States Patent [19]

Eilers et al.

[11] 4,450,589

[45] May 22, 1984

[54] FM RECEIVER FOR RECEPTION OF SPECIAL ANNOUNCEMENTS AND GENERAL PROGRAMS

[75] Inventors: Norbert Eilers, Hildesheim; Peter Brägas, Itzum, both of Fed. Rep. of Germany

[73] Assignee: Blaupunkt-Werke GmbH, Hildesheim, Fed. Rep. of Germany

[21] Appl. No.: 319,655

[22] Filed: Nov. 9, 1981

[30] Foreign Application Priority Data

May 27, 1981 [DE] Fed. Rep. of Germany ....... 3121034

[51] Int. Cl.[3] ................ H04B 1/16

[52] U.S. Cl. ................ 455/205; 455/45; 455/32; 455/36; 455/228; 340/825.72; 340/825.73

[58] Field of Search ................ 455/32, 45, 59, 205, 455/212, 227, 228, 35, 36, 67; 179/1 GC; 340/33, 825-844, 825-872

[56] References Cited

U.S. PATENT DOCUMENTS 3,922,607 11/1975 Wysong ................ 455/45
3,949,401 4/1976 Hegeler et al. ................ 455/227
4,334,320 6/1982 Liman ................ 455/227

FOREIGN PATENT DOCUMENTS 2460983 7/1976 Fed. Rep. of Germany ...... 455/228

OTHER PUBLICATIONS

"Verkehrsrundfunk" by von Peter Brägas, Rundfunktechnische Mitteilungen, vol. 18, No. 4, 8/1974.

l'Onde Electrique, Band 60, NR. 10, Oktober 1980, Seiten 33-38, Paris (FR.), by J. Lepaisant et al.

*Primary Examiner*—Jin F. Ng
*Attorney, Agent, or Firm*—Frishauf, Holtz, Goodman & Woodward

[57] ABSTRACT

To improve reliability of recognition of an announcement recognition (AR) signal radiated by a transmitter upon broadcasting an announcement (e.g. traffic information, news, etc.) in the form of AM modulation of a 57 kHz auxiliary subcarrier, in which the subcarrier is essentially continuously modulated by region or radio-station recognition signals, the level of which changes when the announcement recognition signal is radiated, the subcarrier is filtered in the receiver, demodulated, and the degree of modulation by the frequency characteristics of the region or radio-station recognition frequency (RR) is sensed. If the modulation of the subcarrier at this frequency or frequency band (RR) drops from, for example, 60% modulation to 30% modulation, or less—a 50% level change—a switch (4) is activated which inhibits transmission of audio programs from an external source, such as a tape recorder (5), a tuner tuned to another station, or the like, and reproduces the program or announcement being broadcast by the station to which a region or radio-station recognition frequency is assigned. Termination of the AR signal (FIG. 3: $t_2$), forming the AR modulation on the 57 kHz subcarrier, causes the switch (4) to revert for reproduction of previously controlled audio information upon increase in the level of the RR modulation on the subcarrier, which is sensed in a modulation sensing circuit or network (FIG. 2: 34–37).

34 Claims, 4 Drawing Figures

FM RECEIVER FOR RECEPTION OF SPECIAL ANNOUNCEMENTS AND GENERAL PROGRAMS

The present invention relates to a transmission system, and a receiver therefor, for frequency modulated (FM) radio transmission in which general programs are radiated on the normal, assigned transmitter frequency, and in which special subcarriers are provided to characterize announcements, such as, for example, traffic or other announcements, which are to be radiated in addition to the general programs.

BACKGROUND

The referenced U.S. Pat. No. 3,949,401 describes an FM transmission system in which special recognition frequencies are used for special announcements which are not to be missed by the user of radio receivers, for example automobile radio receivers. Such announcements may, for example, be traffic announcements or sports announcements, and the like. Transmitters which radiate such special announcements can be recognized by radio receiver equipment by sensing an auxiliary carrier which is radiated in addition to the program modulation. A suitable frequency for the additional carrier, besides the program modulation, is 57 kHz which, in stereo transmitters, is radiated as the third harmonic of the 19 kHz stereo pilot tone, in synchronism therewith. The 57 kHz auxiliary carrier is phase-locked to the pilot tone of 19 kHz, so that the zero or null crossings are synchronous, and in the same crossing direction. The auxiliary carrier is used additionally for the transmission of auxiliary information, hereinafter referred to as "recognition", which are superimposed in the form of amplitude modulation on the auxiliary carrier. For a detailed discussion, the referenced U.S. Pat. No. 3,949,401, and the literature cited therein, is referred to.

One of the "recognitions" is radiated together with the announcement. The respective recognition indicates that, during radiation over the FM transmitter, an announcement is being broadcast and, therefore, will be termed herein as announcement recognition, AR for short. An announcement recognition signal—AR signal—corresponds to the signals described as the DK signals in the aforementioned U.S. Pat. No. 3,949,401. The AR signal is within a very narrow frequency band at 125 Hz, modulating the auxiliary carrier of 57 kHz with 30% of the amplitude of the auxiliary carrier.

A receiver which is arranged to operate with the system includes a 57 kHz detector and an amplitude demodulator and switching in the audio stage. The 57 kHz detector and the amplitude demodulator control the switching of the audio output. Various switching arrangements are possible: For example, the amplitude of reproduction during the announcement could be raised to call specific attention thereto—for example to a traffic warning announcement; or, if the receiver is muted, a muting circuit is disabled; or, in a combined radio-cassette recorder, the audio section can be switched over from reproduction from the cassette to reproduction of the announcement when the announcement starts, and for switch-back to reproduction from the cassette when the announcement has terminated. Tape transport in the cassette can also be controlled to cause the cassette to stop and start in synchronism with interruption of its audio output.

The auxiliary 57 kHz carrier can provide further recognition signals. One further such recognition signal is used to characterize a specific transmitting radio station, or a geographic region. All transmitters capable of radiating the announcements which are within a specific geographical region, for example, may be assigned the same region recognition, for short RR, and provide RR signals, which correspond to the BK signals of the aforementioned U.S. Pat. No. 3,949,401. The traffic announcements within a region generally relate to the same geographical area. The region recognition signal modulates the amplitude of the auxiliary carrier continuously with 60% of the auxiliary carrier amplitude. The band width of the various region recognition signals, and their position with respect to each other, is so selected that, with a quality of more than 20, adjacent channel separation of more than 15 db is obtained. Within the available frequency band, six RR signal frequencies have been set in one system, and so relatively positioned that the harmonics of any RR signal fall outside of any other RR signal. Suitable frequencies for region identification, that is, RR signals, are, for example 23.75 Hz, 28.27 Hz, 34.93 Hz, 39.58 Hz, 46.67 Hz, 53.98 Hz, 63.61 Hz, 75.80 Hz, 98.96 Hz and 122.85 Hz.

During an announcement, then, the auxiliary 57 kHz subcarrier is modulated by two recognition signals, namely the AR, announcement recognition, signal, and the RR, region recognition, signal. When no announcement is being given, the auxiliary 57 kHz carrier is modulated only with the RR, the region recognition, signal. Basically, any one transmitter may have a signal representative thereof assigned to it, for radiation on the auxiliary carrier, if the frequency availability of region recognition frequency is sufficient. Thus, the region recognition signal may also be used as a radio station recognition signal, based upon availability of frequencies, so that, within any one geographical area, different transmitters may have different RR frequencies assigned thereto.

The 57 kHz auxiliary or subcarrier can be used in signal-seeking or scanning receivers to cause a scanning tuner to stop and tune in the specific station which radiates the 57 kHz subcarrier, while passing all others. Since the 57 kHz frequency is the third harmonic of the 19 kHz stereo pilot tone, non-linearities in the transmitter, or in the receiver, may cause harmonics of the 19 kHz pilot tone to be erroneously recognized as a 57 kHz subcarrier, by generating a 57 kHz signal upon tuning to a transmitter which does not radiate this subcarrier at all. To prevent such ambiguities, and to avoid response to a spurious third harmonic, the detector for the 57 kHz auxiliary carrier may include an auxiliary recognitiion branch which enables the output from the detector only if a further detector also recognizes the RR (region recognition) signal. Such a system is described, for example, in German Pat. No. 25 33 946.

In one later circuit, the extent or degree of modulation of the auxiliary carrier by the RR signal is determined; if the appropriate degree of modulation of 60% is detected, scanning of the frequency band of a scanning receiver is interrupted and the receiver is locked to that station. This system operates satisfactorily within wide ranges of reception. Under some severe transmission and reception conditions, however, erroneous switching still can occur due to erroneous evaluation of the signal received and erroneous decoding of the signal which may simulate an AR signal. For example, multi-path reception may cause modulation of the 57 kHz auxiliary carrier in such a manner that the AR modulation is simulated, thus triggering erroneous switch-over of the audio stage. This situation may occur, for example, if a vehicle is traveling at a given speed along a divider or picket fence which, by the fortuitous coincidence of spacing of pickets or supports, speed of the passing vehicle, and terrain, or other fortuitous conditions, causes modulation of the 57 kHz carrier at a frequency erroneously simulating the AR frequency.

THE INVENTION

It is an object to improve the recognition of the presence of the announcement recognition (AR) signal so that the auxiliary carrier can be unambiguously evaluated and the receiver unambiguously controlled to reproduce the special program content characterized by the AR signal.

Briefly, the degree of modulation of the auxiliary 57 kHz subcarrier by the region recognition or radio-station signal is sensed and, if this modulation degree drops by a predetermined significant level, for example by 50%, the audio stage of the receiver is switched to reproduce the special program content, for example the announcement, characterized by the AR signal.

In accordance with a feature of the invention, the normal level of the region or radio-station recognition RR signal is 60% degree modulation of the auxiliary 57 kHz subcarrier; when the AR signal, however, is present, the modulation of the subcarrier by the RR signal is dropped to 30% to permit the AR signal to be raised to 60% modulation of the subcarrier, resulting in an overall modulation of the 57 kHz subcarrier of about 90%.

In copending application Ser. No. 06/319,654, filed Nov. 9, 1981, by the inventors hereof, entitled "FM RECEIVER FOR GENERAL PROGRAMS AND SPECIAL ANNOUNCEMENTS", a recognition system is described and claimed in which recognition is effected by sensing an increase in modulation level of the subcarrier from the normally radiated 60% modulation level to 90% (50% increase), and providing a switching control signal in accordance with sensed increase of modulation; in accordance with the present invention, decrease of modulation of the signal by a predetermined frequency—or set of frequencies within a predetermined band—is sensed. Both sensing outputs will be responsive to the same conditions of the received signal-increase in overall modulation degree due to a strong AR signal modulation, with drop in the modulation degree due to the RR signal only. Of course, both recognition criteria can be combined to control audio switching of the receiver, if desired, and if for certain applications switching ambiguities, for example due to stray signals superimposed on the 57 kHz auxiliary subcarrier, can be avoided.

DRAWINGS

Figure 1:
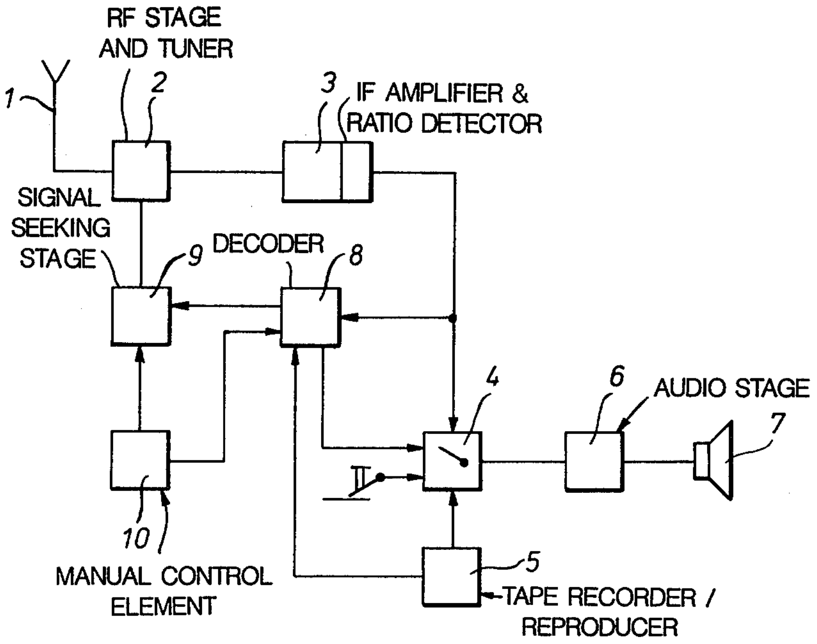
FIG. 1 is a schematic block diagram of an FM receiver, omitting all components not necessary for an understanding of the present invention.

An antenna 1—FIG. 1—applies received input signals to a radio frequency (RF) stage 2, which includes a tuner to tune the receiver to a desired station. An intermediate frequency (IF) stage 3 is connected to a ratio detector from which the program content information which is radiated can be derived. The modulation includes an amplitude-modulated 57 kHz auxiliary carrier. A transfer switch 4 is provided to connect, selectively, signals to an audio amplifier 6 and from then on to a loudspeaker 7, which are derived either from an external audio source, shown as a tape recorder 5, or from the ratio detector 3.

The switch 4 can be operated either manually or automatically. Switch-over can be controlled automatically under command of an announcement decoder 8 which is also connected to receive the output from the IF amplifier and ratio detector 3, forming the FM IF amplification and demodulation stage. The decoder 8 is connected to a signal searching or automatic tuning system, similarly to the tuning system of a panaromic or frequency spectrum receiver, shown as signal seeking stage 9, which controls the tuning adjustment of tuner 2. It is placed in operation by the control element 10. The control element 10 is connected to the decoder 8 to select predetermined signals or transmitters to be sought or tuned under automatic tuning control.

The output signal from the IF amplifier-ratio detector stage 3 is applied to a 57 kHz detector, for example a filter circuit or the like. This circuit is included in the decoder 8, FIG. 2. The 57 kHz detector 11 analyzes the received signal for the presence of the 57 kHz auxiliary subcarrier. The auxiliary subcarrier is then applied to a demodulator 12, in which the amplitude modulation is separated from the auxiliary carrier. The modulation frequencies there include the frequencies of the RR region or radio-station recognitiion signal and, if a special program is to be transmitted, for example, an announcement, the AR or announcement recognition frequency as well.

The AR frequency component and the RR frequency component are separated in two parallel filters 13, 14. Filter 13 covers a frequency band solely characteristic of frequencies within the range of the RR signals. The AR filter 14 covers solely the AR frequency or, if a plurality of frequencies are involved, a band width of the AR signals. An AR decoder is connected to the AR filter 14. The AR decoder senses presence or absence of the AR signal of AR signals, and provides a corresponding logic output to a coincidence stage 18.

The RR filter 13 is connected to an RR decoder 17. The RR decoder 17 can be controlled by an RR signal selector 10 to select one of a plurality of region or radio-station recognition frequencies, if such is desired; since this is not a necessary feature of the invention, the connection between the RR signal selector and the RR decoder 17 is shown in broken line. RR decoder 17 provides an output signal representative of the presence or absence of the RR signal, the frequency or characteristic of which has been selected by the RR signal selector 10 or, if set and wired into the receiver, the presence of the previously wired-in RR frequency. Presence of such a signal is indicated by a connection line to coincidence stage 18.

If coincidence stage 18 has a signal applied at all of its inputs, a switching pulse is applied to the switch 4 which switches-over the audio portion of the signal received by antenna 1 (FIG. 1) of the receiver to the audio stage 6, 7.

The switch 4 in the low-frequency portion of the receiver thus always responds when a signal is received which includes the AR signal, that is, when the transmitter provides its recognition signal that an announcement or special program is to be radiated, regardless of the setting of the audio reproduction portion of the receiver. For example, if the receiver is switched to reproduce audio output from the tape recorder/reproducer 5, reproduction from the external audio signal source formed by the tape recorder/reproducer 5 is interrupted, but only if the receiver senses a received signal from a transmitter and only if the receiver is tuned to a transmitter which is associated with the RR signal which has been selected by signal selector 10, or which is inherent in the apparatus, and which, also, radiates a special program, for example an announcement, as characterized by additional radiation of the AR signal.

Filter 13 additionally is connected to an RR modulation sensing stage 15 which senses the degree of modulation of the auxiliary 57 kHz subcarrier by the RR signal. As long as the sensed modulation degree exceeds a predetermined reference level of modulation, coincidence stage 16 will receive a control signal from the sensing stage 15. The coincidence stage 16 also receives a signal directly of the 57 kHz subcarrier, directly from the 57 kHz detector 11. The output of the coincidence stage 16 is applied to a signal seeking stage 9 in the input section of the receiver as a criterion to determine if the receiver is tuned to a station which radiates the 57 kHz subcarrier, for example to provide a stop signal for scanning the tuning band by an automatic tuning circuit, similar to a signal seeking or panoramic receiver, or, if a signal has been sensed which does not include the 57 kHz auxiliary subcarrier, to continue scanning until such a transmitter is tuned-in.

The decoder 8, so far described, is known, and is used in various types of traffic information radio receivers.

In accordance with the present invention, the region or radio-station modulation RR sensing stage 15 is modified to provide additionally to the output for the signal seeking stage 9, a control signal controlling the operation of the transfer switch 4, in accordance with a logic determination based on the change in degree of modulation by the RR signal of the auxiliary carrier to a significant extent, for example a change in modulation of 50% of prior modulation.

A suitable degree of modulation of the auxiliary 57 kHz subcarrier by the RR signal is 60%. This provides sufficient modulation for recognitiion of the RR signal frequency band by the RR filter 13, for precise recognition of the specific RR frequency in the RR decoder 17. For continuous monitoring, and to permit many receivers to be switched-on at random times, the station will radiate the RR signal at all times by a predetermined degree of modulation, 60% being suitable, unless, at that particular moment, an AR signal is to be radiated. The radiation of the AR signal should take up a substantial degree of modulation of the 57 khz auxiliary subcarrier to insure positive recognition of the AR signal by the AR decoder 19. Since there is a limit to the degree of modulation, increasing the modulation of the 57 kHz subcarrier to 90% is possible, but this will leave only 30% modulation for the AR signal. In accordance with a system described and claimed in the copending application U.S. Ser. No. 06/319,653, filed Nov. 9, 1981 by the inventors hereof, entitled "COMMUNICATION SYSTEM, AND TRANSMITTER THEREFOR, INCLUDING SPECIAL ANNOUNCEMENT RECOGNITION", the modulation level of the RR signal is decreased, for example by 50% of its prior modulation, in the case of 60% modulation thus to to 30% modulation, in order to permit modulating the 57 kHz subcarrier by a greater extent of modulation by the AR signal. This feature can be made use of in further increasing the reliability of recognition of the AR signal, that is, by sensing the change in the RR signal modulation level when the AR signal is also radiated.

Figure 2:
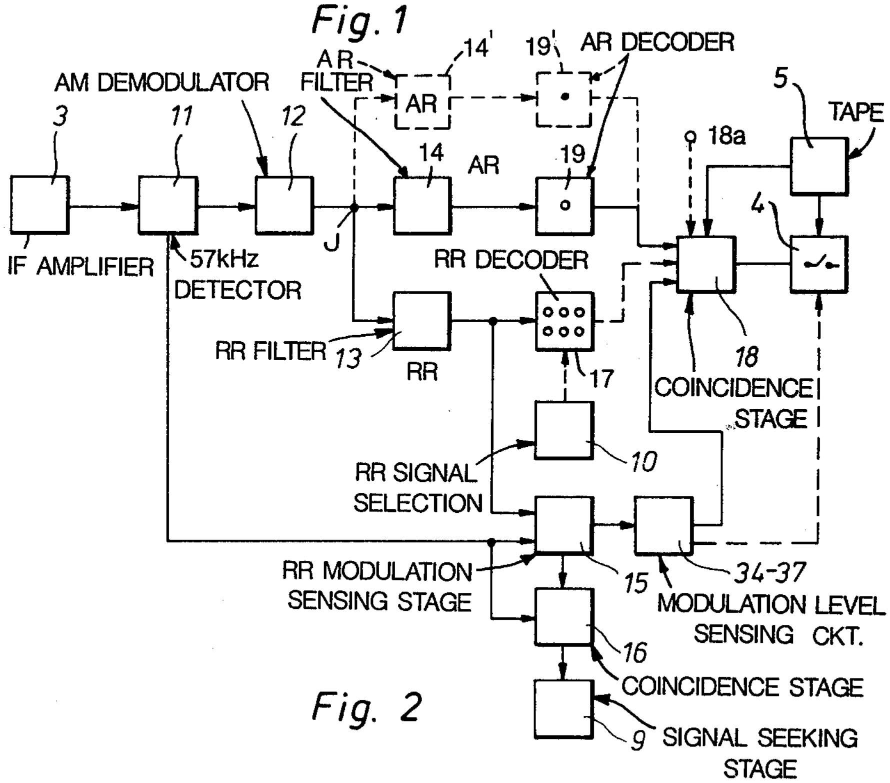
FIG. 2 is a block circuit diagram of an announcement decoder, incorporated in an FM receiver.

In accordance with a feature of the invention, therefore, a modulation level sensing network or circuit 34–37, FIG. 2, is connected to the output of the RR modulation sensing stage 15, the output of which, in turn, is connected to the coincidence stage 18 which, then, controls switch-over of audio output to the audio stage 6, 7, and provides such a control signal to the switch 4 only if the AR detector 19 and the modulation level sensing circuit 34–37 provide an output signal thereto. The output signal from the RR decoder 17 may or may not be required, in accordance with the particular arrangement of the receiver—as will appear below—and therefore is shown only in broken lines. The output from the modulation level sensing circuit or network 34–37 can also additionally be applied directly to the switch 4, for additional reliability of switch-over; since this is not a required connection, it is shown in broken lines. In some arrangements, the connection from the network 34–37 to the coincidence stage 18 can be omitted and only the broken-line connected to switch 4 can be used. In a preferred form, however, the connection is as shown in solid line, that is, from network 34–37 to the coincidence stage 18.

Figure 3:
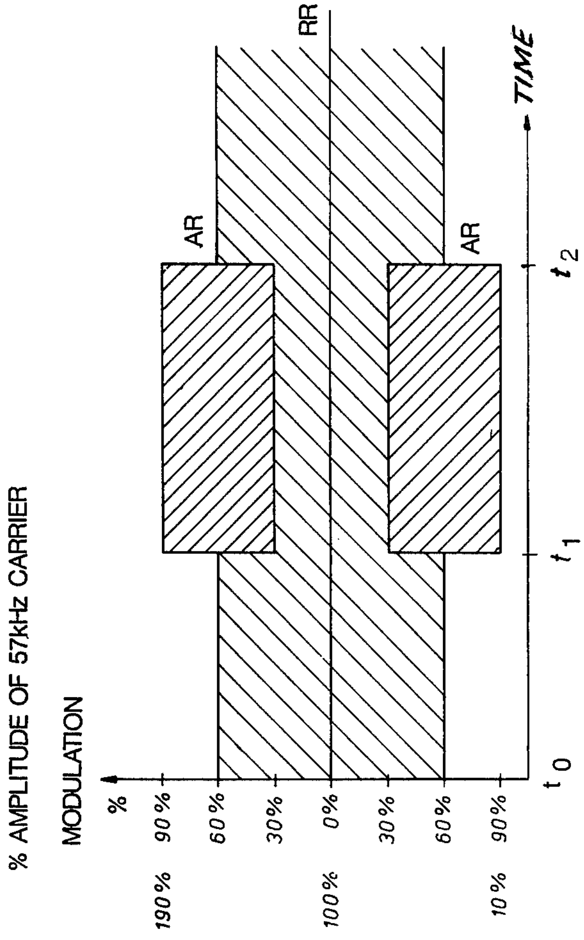
FIG. 3 illustrates percentage modulation, with respect to time, of the auxiliary carrier.

Operation, with reference to FIG. 3: The drop in modulation level of the 57 kHz subcarrier by the RR signal occurs, in accordance with the aforementioned referenced application Ser. No. 06/319,653 filed Nov. 9, 1981, by the inventors hereof, entitled "COMMUNICATION SYSTEM, AND TRANSMITTER THEREFOR, INCLUDING SPECIAL ANNOUNCEMENT RECOGNITION". The drop in degree of modulation of the auxiliary 57 kHz subcarrier is graphically seen in FIG. 3 and permits increase of amplitude modulation of the auxiliary 57 kHz subcarrier by the AR modulation to 60% of the AR signal. The operation, with respect to time, is graphically seen in FIG. 3 in accordance with the referenced application. During normal radiation time, and when no special program is to be radiated, for example at time $t_0$, the auxiliary 57 kHz subcarrier is modulated by the RR signal to about 60% of modulation. A special program, for example an announcement, is to be broadcast at time $t_1$ and, at that time and in order to cause change-over of audio reproduction from, for example, an external source 5, or from a muted condition of the receiver, or from another station, the AR signal is modulated on the auxiliary 57 kHz subcarrier. The degree of modulation of the auxiliary 57 kHz subcarrier by the RR signal is dropped from 60% to 30% at time $t_1$, while the AR modulation signal is impressed on the auxiliary 57 kHz subcarrier with 60% degree of modulation. The overall modulation of the 57 kHz auxiliary subcarrier then will be 90%. At the termination of the special program, for example the announcement, the previously and quiescent broadcasting conditions will be reestablished; at time $t_2$, thus, the AR signal will disappear, and the amplitude modulation of the 57 kHz auxiliary subcarrier is dropped from 90% to 60% by raising the modulation of the auxiliary subcarrier by the RR amplitude modulation signal.

The significant drop of the degree of modulation of the auxiliary RR subcarrier solely by the RR frequency or frequencies thus is 50% of its previous value, that is, the degree of modulation of the auxiliary subcarrier by the RR signal has changed from 60% to 30%; it has dropped below 50% of modulation level. This change in modulation at the RR signal frequencies is utilized as an additional criterion to enhance the reliability of switch-over and to eliminate possible ambiguities due to, for example, multiple signal paths in reception, extraneous disturbances, and the like, which are more likely to affect the AR signal in the system proposed. Typical frequencies for the AR signal are above 125 Hz, and may go to 170 Hz, whereas typical frequencies for the RR signals are in the 23 Hz to below 60 Hz range. Preferably, the AR signal should have a frequency which is above the second harmonic of power network frequency, above 120 Hz, as fully explained in the referenced application Ser. No. 06/319653, filed Nov. 9, 1981 by the inventors hereof, entitled "COMMUNICATION SYSTEM, AND TRANSMITTER THEREFOR, INCLUDING SPECIAL ANNOUNCEMENT RECOGNITION".

Figure 4:
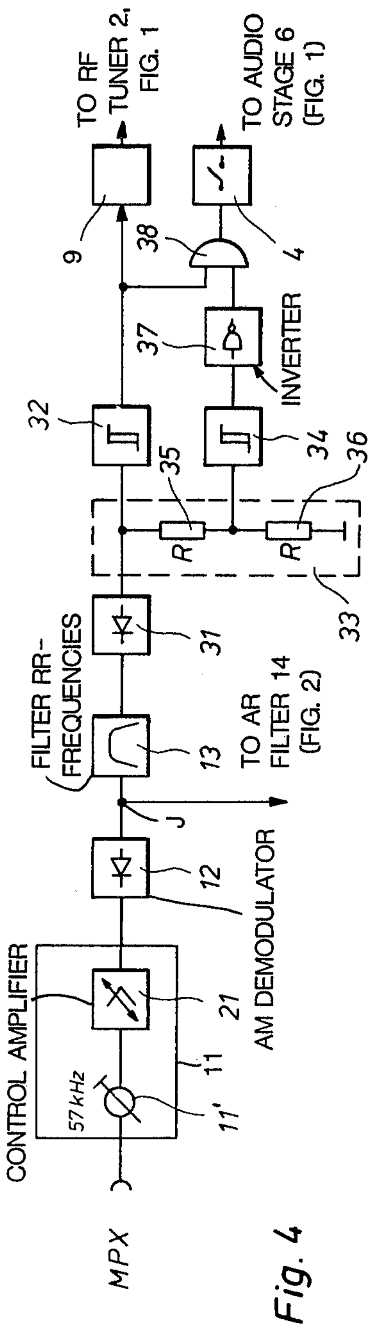
FIG. 4 is a schematic block circuit diagram of the modulation level sensing stage.

The network or circuit 34–37, FIG. 2, is shown in detail in FIG. 4. The 57 kHz detector, which receives the MPX signal from the IF amplifier and ratio detector 3, includes a 57 kHz filter 11' and a control amplifier 21. The filter 11' filters the 57 kHz auxiliary subcarrier from the received, IF-amplified and FM-detected signal, and applies the so-filtered AM-modulated 57 kHz subcarrier to a control amplifier 21 which provides a level output of the 57 kHz subcarrier signal. Such control amplifiers are known; they include a feedback circuit with a long time constant to provide an output at a predetermined controlled level, regardless of the level of the input thereto. The time constant of the control amplifier 21 is substantially longer than the cycling or undulation time or the periods of the lowest modulation frequency of the auxiliary 57 kHz subcarrier; the time constant may exceed 1 second and more. A suitable time is, for example, about 5 times the cycle duration of the lowest frequency of the modulation frequency signals, but may be more. A suitable circuit for amplifier 21 is shown in "Guidebook for Electronic Circuits" by John Markus, McGraw-Hill Book Co., 1974, p, 57, "30 db Dynamic Range" Gain Control Circuit, also published in "Analog Dialogue", Vol. 7, No. 1, page 13. The output signal from the amplifier 21 is demodulated in the AM demodulator 12 so that the output from the AM demodulator 12 will provide an output signal which includes the frequencies of all AM modulations applied to the 57 kHz auxiliary subcarrier.

Filter 13 is connected to receive the output from AM demodulator 12. Filter 13 is a low-pass band-pass filter which has an upper limiting filtering frequency corresponding to the frequency of the highest one of the RR signals. The output from filter 13 is rectified in rectifier 31.

Since the level of the auxiliary 57 kHz subcarrier is controlled to a constant level in the control amplifier 21, the output signal from the rectifier 31 will be unambiguously representative to the degree of modulation of the auxiliary 57 kHz subcarrier by the signals passed by the band-pass filter 13. The output signal from the rectifier 13 is applied to a threshold switch 32, for example a Schmitt trigger, and additionally to a preferably identical threshold switch 34 which is connected to a junction or tap between two resistors 35, 36 of a voltage divider 33. The resistance values of the resistors 35, 36 are equal, so that the voltage at the junction between the resistors will be half the voltage across the voltage divider 33. The circuit is so arranged that the threshold switch 32 responds when the modulation degree of the auxiliary carrier exceeds 30%. Threshold switch 32, thus, is associated with the lowest degree of modulation with which the system is to operate.

The second threshold switch 34, if at least essentially identically constructed to threshold switch 32, responds only when the degree of modulation of the auxiliary 57 kHz subcarrier by the RR frequencies reaches 60% and, thus, is associated to a higher degree of modulation at that modulation frequency. The output signal of threshold switch 32, and the output signal of threshold switch 34, after inversion in an inverter 37, are combined logically in a logic AND-function gate 38. The AND-function gate 38 provides a control signal for the switch 4 when the degree of modulation of the auxiliary carrier drops from 60% to 30% and stays there—see time period $t_1$ to $t_2$, FIG. 3.

When the degree of modulation of the auxiliary carrier by the RR frequency again rises to 60%, the control signal applied to switch 4 changes and the receiver can revert to the previously set audio reproduction from whatever source, for example from tape recorder/reproducer 5, providing an audio signal external of the signal received by antenna 1 (FIG. 1).

When the output signal from the rectifier 31 corresponds to the modulation degree or percentage of 60%, both threshold switches are in "response" or "ON" condition, since both threshold switches start to respond at already 30% modulation. The output signal from the second threshold switch 34 is inverted in inverter stage 37 and no coincidence of signals is applied to the AND-function gate 38. Upon drop of the modulation degree or extent to 30%, the first threshold circuit 32 remains ON, whereas the second threshold circuit 34, due to its decreased input voltage as divided by the voltage divider 33 changes to OFF. This OFF is inverted in the inverter 34, providing coincidence of two OFF signals to the AND-gate 38.

The output signal of the threshold switch 32 can also be utilized to indicate presence of the auxiliary 57 kHz subcarrier, and thus can replace stages 15, 16, FIG. 2.

The output signal from the AND-gate 38 is preferably applied to the coincidence stage 18, as shown in full-line representation of FIG. 2. Change-over of the switch 4 will then occur only if two conditions pertain: (a) the AR signal has been sensed in the AR decoder 19, and (b) the degree of modulation of the auxiliary 57 kHz subcarrier by the RR signal has dropped by a significant amount. This arrangement has advantages when various AR signals of different frequencies are used which are immediately adjacent the lower limiting frequency of the audio signal to be reproduced. A plurality of AR frequencies may be desirable if various types of special programs are to be separately identified, fog example announcements in different languages, announcements or special programs of different content, such as traffic information, emergency information, general news, sports reports, and the like.

FIG. 2 illustrates a parallel-connected AR filter 14', which has a filtering frequency different from filter 14, and associated with an AR frequency characterizing a program content different from that characterized by the AR frequency to which filter 14 is connected. Decoder 19' is responsive to the output from filter 14', and thus provides a coincidence output to the coincidence stage 18. OR-gates, buffers, and the like, and isolating circuitry and circuit components between the respective circuits 14, 14', 19, 19' and 18 have been omitted for clarity; their use is well known in circuit technology.

In some systems, the region or radio-station recognition (RR) signal may drop to a level below 30% modulation, or even to zero modulation, when the AR signal is being radiated. The connection from the RR decoder 17 to the coincidence stage 18 may then not be needed; or, alternatively, the connection does not require coincidence with the remaining inputs to the coincidence gate 18, for example merely being connected thereto when present, so as to characterize the response of the receiver, but not required for coincidence recognition. For this reason, the connection from decoder 17 to the coincidence stage 18 is shown in broken line.

Basically, therefore, the receiver provides for change in the switching state of the switch 4 as a function of a significant change in the modulation of the 57 kHz subcarrier by the RR signal, the modulation level of which is sensed in the circuit of FIG. 4. "Significant change" cannot be enumerated in specific percentages or degrees of modulation for all purposes; the accuracy and unambiguity of switch-over will depend, however, on clear distinction between various levels of modulation. In the example shown, a 50% change in modulation of the subcarrier—from 60% modulation to 30% modulation—clearly is a "significant change". A smaller change may, however, be suitable, such as, for example, a 30% change of modulation (60% to 40%, for example), or even less if unambiguous switching can be obtained. The system is particularly applicable for mobile radio use, and especially for car radio apparatus which includes tape recording/reproduction audio systems, or other audio reproduction units, such as, for example, CB (Citizen Band) equipment which is reproduced through at least a portion of the audio stage 6 and reproduced by the loudspeaker 7 of the apparatus, and the reproduction of which should be inhibited when an AR signal is being sensed. A "significant change" in the modulation level, thus, is a change of such magnitude that the circuit 34–37, FIG. 2, will respond, unambiguously, when the modulation has changed indicative of the drop in level of an RR signal, but will not respond to stray or noise signals, or modulations of the 57 kHz detector which is caused by extraneous variations, for example multi-path reception or the like of a receiver installed in a moving vehicle.

U.S. application Ser. No. 06/319,654, filed Nov. 9, 1981, by the inventors hereof, entitled "FM RECEIVER FOR GENERAL PROGRAMS AND SPECIAL ANNOUNCEMENTS" describes and claims an additional criterion for recognition, namely the overall or entire degree of modulation of the auxiliary 57 kHz subcarrier or, respectively, the change in the degree of modulation when the AR signal is present—see FIG. 3—from 60% to 90%. This additional criterion can also be applied in the receiver system of the present application by branching another circuit behind the AM demodulator 12 (FIGS. 2, 4) from junction J, and applying the output as an additional coincidence-required input to the coincidence stage 18 or as an additional coincidence input to the switch 4—see broken line, FIG. 2, in a similar manner. This, then, provides an additional criterion. An additional input to coincidence gate 18 to further enhance the selectivity and error rejection thereof is schematically shown by connecting line and terminal 18*a*. Since this is not a required or necessary feature, the connection is shown in broken lines.

We claim:

1. FM receiver having a radio frequency and tuning stage and a demodulator connected thereto for frequency demodulation of received signals including a carrier signal and an auxiliary carrier signal of a predetermined auxiliary carrier frequency, said auxiliary carrier being amplitude-modulated by at least one frequency within a predetermined frequency band;

a detector means connected to the radio frequency and tuning stage for detecting the auxiliary carrier signal of the predetermined auxiliary carrier frequency;

an amplitude demodulator connected to the detector and detecting the amplitude modulation of the auxiliary carrier;

a switchable output stage;

a switch connected to the amplitude demodulator adapted to be controlled by the amplitude modulation of the auxiliary carrier and connected to the switchable output stage;

a frequency selection filter tuned to pass at least one predetermined frequency of a frequency band of amplitude modulation on the auxiliary carrier, connected to receive the detected modulation from the amplitude demodulator, and providing an output signal representative of the level of amplitude modulation of the auxiliary carrier by said at least one predetermined frequency;

means for detecting amplitude modulation of the auxiliary carrier by at least said one predetermined frequency of the frequency band;

the improvement comprising means for detecting change in the lever of percent of amplitude modulation of the auxiliary subcarrier by an least said predetermined frequency of said frequency band;

and level sensing means responsive to said level of percent of amplitude modulation detecting means for providing a switching control signal to said switch when the level of percent of modulation of said auxiliary carrier by at least said predetermined frequency of said frequency band changes by a significant value from a previously existing percent level of modulation.

2. Receiver according to claim 1, wherein said level sensing means are means to sense a significant drop in modulation of said auxiliary carrier by at least said predetermined frequency of said frequency band (RR) from a previously existing level, and for providing said switching control signal for the duration of sensing of said decreased modulation level.

3. Receiver according to claim 2, wherein the level sensing means provides said switching control signal upon a drop in the level of modulation of the auxiliary carrier by at least said predetermined frequency of said frequency band from about 60% to up to about 30%.

4. Receiver according to claim 1, wherein said level sensing means includes means responsive to a drop in the level of modulation of the auxiliary carrier by at least said predetermined frequency of said frequency band by about 50% of a previously existing modulation level.

5. Receiver according to claim 1, wherein the level sensing means comprises means for providing said switching control signal upon a change of modulation level of said auxiliary carrier by at least said predetermined frequency of said frequency band (RR) from over 50% modulation to under 50% modulation.

6. Receiver according to claim 1 or 3 or 4 or 5, wherein said level sensing means includes a control amplifier, said filter, and a rectifier rectifying the filtered output and providing a signal representative of the level of modulation of said auxiliary carrier by at least the predetermined frequency of the frequency band (RR);

and wherein said level sensing means comprises two threshold switches, one threshold switch having a first threshold level representative of a first degree of modulation of said auxiliary carrier, and a second threshold switch having a threshold reference level which is significantly lower than said first threshold level;

an AND-function gate connected to be responsive to the outputs of said threshold switches, said AND-function gate being connected to and controlling the switching operation of said switch;

and an inverter connected between the output of the threshold switch having said significantly lower threshold response level and the AND-function gate.

7. Receiver according to claim 6, wherein said threshold switches have an approximately identical response level;

and said level sensing means further includes a voltage divider connected between the output or the amplitude demodulator and said threshold switches, one of said threshold switches being connected directly to the output of the amplitude demodulator, and the other being connected to a tap point of the voltage divider.

8. Receiver according to claim 7, wherein the voltage divider comprises two resistors having approximately equal resistance, and the threshold switches are adjusted for a threshold level corresponding to a signal across the voltage divider representative of about 30% modulation of the auxiliary carrier.

9. Receiver according to claim 1, to receive radio transmissions in which the auxiliary carrier is, selectively, amplitude-modulated with a region or radio-station recognition (RR) signal within said frequency band and, selectively, additionally modulated at predetermined time intervals ($t_1$–$t_2$) by a further announcement recognition amplitude modulation frequency (AR) outside of said predetermined frequency band (RR);

and wherein an announcement recognition frequency decoder means is connected to receive the amplitude-modulated auxiliary subcarrier and providing an output signal if the frequency of the announcement recognition (AR) frequency is detected;

said system further including a coincidence stage having the output from the announcement recognition decoder and from said level sensing means applied thereto, said coincidence stage being connected in controlling relation to said switch.

10. Receiver according to claim 9, further including an additional input to said coincidence stage, and means connected to said additional input for providing an additional required coincidence signal representative of at least one of a preset level of amplitude modulation and a change of level of amplitude modulation within said predetermined frequency band and the frequency band of said announcement recognition signal.

11. Receiver according to claim 1, in combination with an external source of audio signals, said switch being connected to, selectively, connect an audio channel from said external source to the switchable output stage or audio signals received by the receiver to the switchable output stage;

said switch being connected to interrupt an audio signal path from the external source to the switchable output stage when said level sensing means senses a significant decrease in the amplitude modulation of the auxiliary subcarrier by at least frequency of said frequency band and to reconnect said audio channel to the external source upon termination of the significant change, and reversion to a prior level of modulation of the auxiliary subcarrier by at least said predetermined frequency of the frequency band (RR).

12. Receiver according to claim 11, wherein said external source of audio signals comprises at least one of tape reproduction equipment, C.B. receiver and the like;

and said auxiliary subcarrier has a frequency of about 57 kHz, said significant change in the level of the modulation of the subcarrier by said frequency or frequency band (RR) being a drop of about 50% of the modulation level from about 60% modulation to about 30% modulation of the 57 kHz auxiliary subcarrier.

13. Receiver according to claim 1, wherein said auxiliary carrier is amplitude-modulated by one frequency and selectively by a second frequency;

and wherein said level sensing means is responsive to a drop in level of amplitude modulation by said one frequency from a first level above 50% modulation to a second, and significantly detectable level below 50% modulation;

and means for detecting coincident presence of said drop in level of modulation of said one frequency and presence of said second frequency.

14. Receiver according to claim 1, wherein said auxiliary carrier is amplitude-modulated by one frequency and selectively by a second frequency;

and wherein said sensing means is responsive to a change in level of amplitude modulation of said one frequency between a first level above 50% modulation and a second, and significantly detectable level below 50% modulation;

and means for detecting coincident presence of said change in level of modulation of said one frequency and presence of said second frequency.

15. In a radio receiving system having a FM radio receiver, an audio output stage including switching means switchable among various audio signal sources in addition to the FM receiver, a method of removing ambiguities in recognition of a control signal portion with respect to a received signal which contains other signal portions, in which the received signal is a frequency-modulated (FM) signal and includes an auxiliary subcarrier within its frequency band, said subcarrier being amplitude-modulated by at least one region or radio-station recognition frequency signal with a predetermined frequency within a recognition frequency band, the improvement comprising the steps of filtering the auxiliary subcarrier from the received signal;

determining different levels of percent of amplitude modulation of said subcarrier at said predetermined frequency in said frequency band;

and providing an output signal representative of a change of at least one level of percent of amplitude modulation of the subcarrier by said recognition signal for controlling the audio output stage.

16. Method according to claim 15, wherein the step of determining the different levels of percent of amplitude modulation of the subcarrier comprises determining the significant change in at least one level of modulation with respect to a previously prevailing level or percent of modulation;

and the step of providing the output signal comprises providing said output signal when the change in the level or percent of modulation exceeds a significant level.

17. Method according to claim 16, wherein said step of providing the output signal comprises providing said output signal when the change in amplitude modulation at said frequency is about 50% of the prior level modulation.

18. A radio receiver including, means responsive to radio broadcasts of assigned frequency for reproducing regular program content;

means responsive to an auxiliary carrier of predetermined frequency amplitude modulated with first and second recognition signals at first and second recognition signal frequencies for causing said receiver to reproduce an auxiliary special broadcast;

the means responsive to the auxiliary carrier including means for detecting the level of percent of amplitude modulation of the auxiliary carrier by the first recognition signal modulating the auxiliary carrier; and means connected to the detecting means for controlling the receiver reproduction to reproduce the special broadcast only when the level of percent of amplitude modulation detected by the detecting means falls below a predetermined percentage level of the auxiliary carrier.

19. The receiver according to claim 18 further comprising, in addition to the means for detecting the level of modulation of the auxiliary carrier by the first recognition signal, means for responding to the second recognition signal to produce an output, and said means for controlling the receiver reproduction being connected to the level detecting means and the means for responding to the second recognition signal to switch an audio output stage into reproducing relation to the special broadcast.

20. The receiver according to claim 19, wherein the means for responding to the second recognition signal comprises means for selecting one of plural frequencies identifying one of plural special broadcasts.

21. The receiver according to claim 19 further comprising, in addition to the means for detecting the level of modulation of the auxiliary carrier by the first recognition signal, means for responding to the first recognition signal to produce an output whenever the first recognition signal is present, and said means for controlling the receiver reproduction being further connected to the means for responding to the first recognition signal to cause switching of the audio output stage to reproduce the special broadcast when outputs are provided by the means for detecting the level and the means for responding to the first recognition signal.

22. The receiver according to claim 21, wherein the means for responding to the first recognition signal comprises means for selecting one of plural frequencies identifying particular broadcast sources.

23. The receiver according to claim 19, wherein the means for controlling the receiver reproduction includes coincidence circuit means connected with said means for detecting the level of modulation by the first recognition signal and connected with said means for responding to the second recognition signal, said coincidence circuit means being connected in controlling relation to a switching means for connecting the audio stage to the special broadcast.

24. The receiver according to claim 18, wherein the means for detecting the level of modulation by the first recognition signal includes a filter adapted to pass modulations of the auxiliary carrier at the first frequency of the first recognition signal and a modulation sensing stage for determining the level of the modulation by the first frequency with respect to the level of the auxiliary carrier.

25. The receiver according to claim 18 further comprising, a signal seeking circuit means responsive to the first recognition signal to select a received transmission.

26. The receiver according to claim 25 further including, means connecting the signal seeking circuit means to a first modulation level detection circuit forming a part of the level detection means and having a first threshold level above which an output is applied to the signal seeking circuit means sufficient to cause the signal seeking circuit means to fix on a broadcast signal.

27. The receiver according to claim 26 further including, a second level detection circuit forming a part of the level detection means and having a second threshold level representing said predetermined percentage level below which a broadcast is reproduced, and means responsive to outputs of the first and second level detection circuits and connected to the means for controlling the receiver for connecting an audio stage in reproducing relation to a demodulated signal with an auxiliary special broadcast.

28. The receiver according to claim 27, wherein the second level detection circuit has a threshold above which level the modulation of the auxiliary carrier by the first recognition signal causes an output, and inverter means connecting the output terminal of the second level detection circuit and the signal seeking circuit.

29. For use in an FM radio receiver having a tuner, an RF stage, an output audio stage including switching means switchable among various audio signal sources in addition to the FM receiver, the improvement comprising means for detecting amplitude modulation of an auxiliary subcarrier at a preselected frequency of a first recognition signal and for producing an output when the percent amplitude of modulation level of the first recognition signal is below a predetermined value, and means responsive to the output from said means for detecting for controlling said switching means to connect the receiver to its audio stage when said modulation below the predetermined value is detected.

30. The improvement according to claim 29 further comprising, means for detecting the amplitude modulation of the auxiliary carrier by a second, distinct recognition signal simultaneously with detecting amplitude modulation below said level, said means for controlling being connected to said means for detecting modulation by the second signal to effect switching of the receiver to its audio stage when both the second recognition signal and said modulation below a predetermined value are detected.

31. The improvement according to claim 30, wherein the means for controlling includes second means for ascertaining the amplitude modulation of the auxiliary carrier by the first of the two distinct recognition signals simultaneously with detecting the amplitude modulation by the second recognition signal and amplitude modulation below said level, said means for controlling being connected to said second means for ascertaining to effect switching of the receiver to its audio state when both recognition signals and said modulation below a predetermined value are detected.

32. A method of detecting and reproducing a special broadcast including monitoring radio broadcasts for an auxiliary carrier; determining whether said auxiliary carrier, when present contains at least one of a first and second recognition signal amplitude modulating the auxiliary carrier at at least one of a first and second frequency, determining whether the percent of amplitude modulation of the auxiliary carrier at the first frequency falls below a predetermined value, and switching the special broadcast to an audio output stage when the first frequency is below the predetermined value.

33. The method according to claim 32, further comprising, in addition to determining whether the modulation falls below, monitoring received broadcasts for the presence of at least one of the first and second recognition signals, and producing a switching signal when the presence of the one of the recognition signals coincides with the level of modulation being below the predetermined level.

34. The method according to claim 33, wherein the step of producing the switching signal includes producing that signal only when the presence of both recognition signals coincides with the level of modulation being below the predetermined level.

* * * * *

UNITED STATES PATENT AND TRADEMARK OFFICE
CERTIFICATE OF CORRECTION

PATENT NO. : 4,450,589

DATED : May 22, 1984

INVENTOR(S) : Norbert EILERS et al

It is certified that error appears in the above-identified patent and that said Letters Patent is hereby corrected as shown below:

Claim 11, Col. 12, Lines 11-12:

"...least frequency of said frequency band..." should read -- ...least said predetermined frequency of said frequency band ... --

Claim 32, Col. 15, line 18:

"...present contains..." should read -- ... present, contains ... --

Signed and Sealed this

*Eleventh* Day of *December 1984*

[SEAL]

*Attest:*

GERALD J. MOSSINGHOFF

*Attesting Officer* *Commissioner of Patents and Trademarks*